United States Patent [19]

Siniscalchi

[11] Patent Number: 4,775,581
[45] Date of Patent: Oct. 4, 1988

[54] TAPE FOR USE IN PROTECTION AND WATERPROOFING OF STITCH LINES IN PADDING AND PADDED GARMENTS

[76] Inventor: Lucio Siniscalchi, Via Milano, 53, 22059 Robbiate (Como), Italy

[21] Appl. No.: 65,768

[22] Filed: Jun. 23, 1987

[30] Foreign Application Priority Data

Jun. 27, 1986 [IT] Italy ................................. 22407/86[U]

[51] Int. Cl.$^4$ ........................ B32B 25/12; B32B 25/10
[52] U.S. Cl. .................................... 428/286; 428/288; 428/343; 428/351; 428/354; 428/355; 428/423.5
[58] Field of Search ............ 428/343, 351, 355, 423.5, 428/354, 286, 288

[56] References Cited

U.S. PATENT DOCUMENTS

| 2,647,843 | 8/1953 | Bemmels | 428/351 |
| 3,084,067 | 4/1963 | Smith | 428/351 |
| 3,676,185 | 7/1972 | Phillips et al. | 428/351 X |
| 3,684,644 | 8/1972 | Snell | 428/351 X |
| 4,539,255 | 9/1985 | Sato et al. | 428/423.5 X |
| 4,560,611 | 12/1985 | Naka et al. | 428/423.5 X |

Primary Examiner—Paul J. Thibodeau
Attorney, Agent, or Firm—Bucknam and Archer

[57] ABSTRACT

A self-adhesive tape for waterproofing the stitch lines of padding material having a high degree of thermal insulation, usable in clothing and the like is composed of a support layer of polyamide fibre fabric, a waterproofing layer of polyurethane resin, and an adhesive layer of great adhesion and cohesion and based on elastomers.

1 Claim, 1 Drawing Sheet

TAPE FOR USE IN PROTECTION AND WATERPROOFING OF STITCH LINES IN PADDING AND PADDED GARMENTS

BACKGROUND OF THE INVENTION

Padding materials are currently utilised for the manufacture of many different articles of sports clothing such as windcheaters, anoraks, ski suits and the like. For such purposes the padding must have good characteristics of impermeability to water, whilst exhibiting a certain permeability to air so as to ensure a high degree of protection against the external environment whilst maintaining a high degree of comfort. In the production of such articles of clothing it is necessary to join a number of different pieces together and this is usually achieved by stitching, which inevitably constitutes a possible path for the infiltration of water, especially if the garment is used for a long time in adverse climatic conditions.

All attempts made until now to protect such stitch lines have been found to be entirely insufficient in that they do not completely prevent the infiltration of water through the stitch lines.

OBJECTS OF THE INVENTION

A primary object of the present invention is that of eliminating the above indicated disadvantages by providing a tape for the protection and waterproofing of stitch lines in padding having a high degree of thermal insulation, usable in clothing and the like, which offers the possibility of preventing the infiltration of water along the stitch lines in an absolute manner without reducing the characteristics of comfort typical of such garments.

Another object of the invention is to provide a tape which requires no complicated application steps, and which is perfectly compatible with the types of materials conventionally utilised.

Still another object of the present invention is to provide an article of clothing which has considerably improved characteristics, further offering an increased strength along the stitch lines.

A further object of the present invention is to provide a tape which is able to offer the widest guarantees of reliability and safety in use.

SUMMARY OF THE INVENTION

According to the present invention there is provided a self-adhesive tape which can be applied over the stitch lines of an item of clothing having padding with a high degree of thermal insulation, characterised in that it comprises a support layer of fabric coated on one face with a cladding layer of waterproof synthetic resin and having a self-adhesive elastomer based layer on the other face.

The tape of the present invention is applicable to padding for any purposes, including furnishings, but will be described hereinafter with specific reference to clothing without, of course limitation to the generality thereof.

The present invention also comprehends a padded garment having stitch lines rendered waterproof by use of the tape of the present invention. Various other features and advantages of the present invention will become apparent from a study of the following descriptions of a preferred embodiment, in which reference is made to the accompanying drawings, provided purely by way of non-limitative example.

DESCRIPTION OF THE PREFERRED EMBODIMENT

Figure 1:
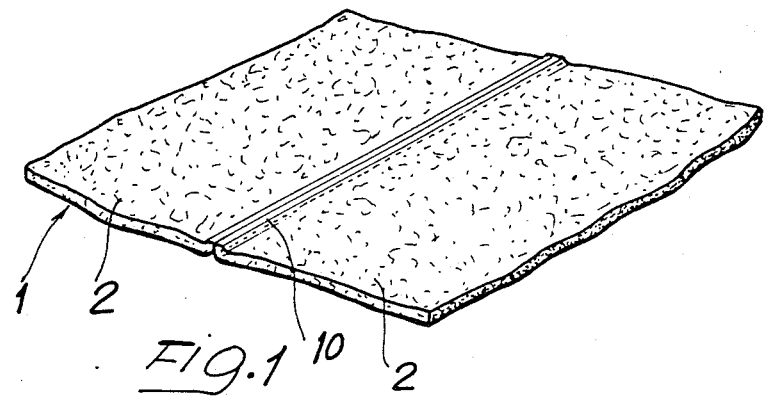
FIG. 1 is a schematic perspective view showing two pieces of padding joined by a line of stitching.
Figure 2:
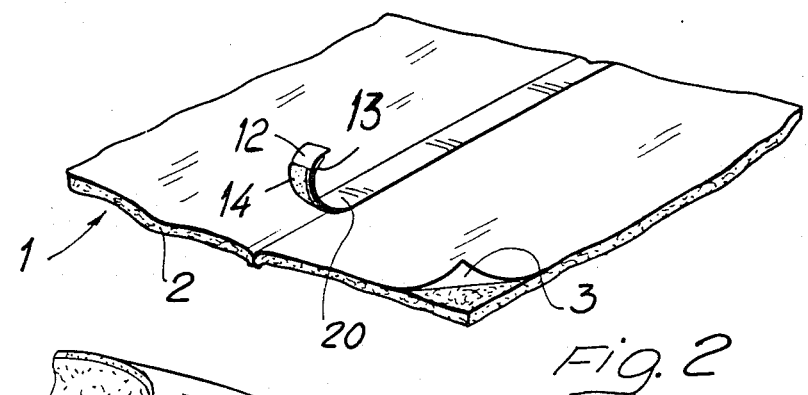
FIG. 2 is a similar perspective view showing the application of the stitch line with an enlarged view of the waterproofing tape itself showing its constituent parts.
Figure 3:
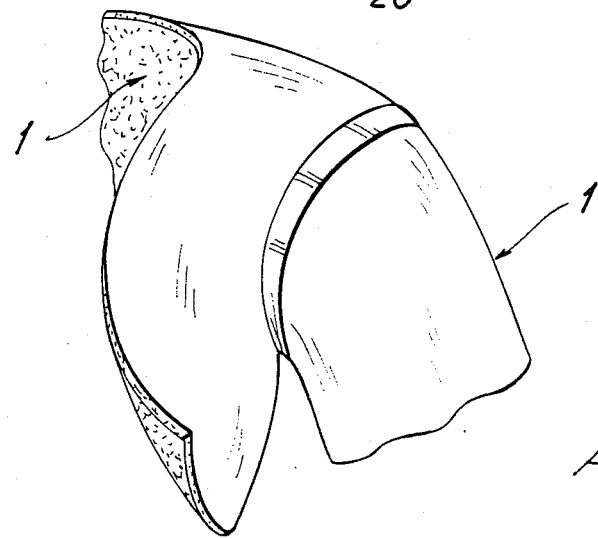
FIG. 3 is a schematic perspective view of a part of an article of clothing provided, along the stitching line, with an adhesive tape according to the invention.

With reference now to the drawings, FIG. 1 illustrates padding having a high degree of thermal insulation.

More specifically, the padding disclosed in the mentioned application No. 20978 A/84 is a syntetic fibre padding including a base layer containing a plurality of discontinuities, distributed between the fibres of the padding material, so as to provide air pockets to act as barriers to the passage of heat.

The padding disclosed in the mentioned application No. 23448 A/84, on the other hand, comprises a base layer consisting of carded fibres, which has been surface threaded by means of a plastics glue mixture and then calendered to reduce its thickness, at least one of the padding faces being provided with a layer of metal particles embedded in plastics material.

Finally, the padding of the mentioned application No. 23693 B/84 substantially comprises a base layer like that disclosed by the mentioned application No. 20978 A/84 on at least a face thereof is coated a surface layer consisting preferably of acrylic, polyurethanic or vinylic resins, both in emulsion and solution form, which have been pigmented by aluminum powder, to provide the surface of said base layer with a metalized aspect.

The padding, which is generally indicated with the reference numeral 1 in the attached drawing, has a layer 2 which is obtained by carding a mixture of fibres of, for example, siliconised polyester or the like, and the production process for the layer provides for the impregnation of the layer 2 with a soft and elastic cross-linkable resin on one side and a more rigid, but elastic, resin on the other side. Subsequently, a calendering operation is performed under controlled temperature and pressure on the impregnated layer to create an air chamber within the padding, and a metallised or other cladding layer 3 is then applied to one face of the layer by appropriate techniques as described in the earlier Patents referred to above. This has the twin benefits of increasing the thermal insulation and increasing the water impermeability of the padding layer 2 whilst maintaining the characteristics of transpirability and comfort. The padding 1 is then ready for making up into various articles of clothing and furnishings.

When the padding 1 is used for making up the garments, however, it is necessary to connect together a plurality of different pieces of padding, preliminarily cut out to shape, and this connection is almost invariably effected by stitching. The lines of stitching so produced have, until now, constituted a possible route for the ingress of air, and particularly moisture, which could penetrate through the cladding fabric and infiltrate into the interior of the garment, particularly if subjected for a long time to rain, sea water spray and so on. Outdoor garments having thermal insulation for the purpose of increasing the wearer's comfort thus eventually fail in this purpose when the interior becomes wet. In order to overcome this problem the present invention provides for the application along the stitching lines, schematically indicated 10, of a strip of self-adhesive tape 20 of special type, which is constituted by a polyamide fibre fabric support 12 of high strength which, on one face is treated with a waterproof cladding layer 13 of synthetic resin such as an acrylic, vinyl, polyurethane or other resin which ensures its impermeability to water, whilst ensuring the softness and manipulability of the finished product.

On the other face of the tape 20 there is applied an elastomer based self-adhesive layer 14 which is highly adhesive and also highly cohesive due to characteristics of self cross-linking of the adhesive itself.

In a preferred, but in no way limiting embodiment, a base tape made from a polyamide fibre fabric of between about 50 and 60 grammes/meter is utilised. For general purpose use the most appropriate and preferred colour is white. The waterproof external cladding is made of polyurethane resin applied at a rate of about 5–15 grammes/square meter.

The self cross-linking elastomer based adhesive is applied at a rate of between 30–40 grammes/square meter.

One example of a suitable adhesive is given in the following table, in which the proportions are by weight:

| | |
|---|---|
| natural rubber (NR) | 20.000 |
| antioxidant (sterically inhibited polyphenol) | 0.100 |
| active zinc oxide | 2.000 |
| zinc resinate | 1.500 |
| stearic acid | 0.100 |
| hydrogenated polycyclodiene hydrocarbon resin | 9.000 |
| aliphatic hydrocarbon resin with cyclic structure | 2.000 |
| polyaliphatic hydrocarbon resin | 5.000 |
| reactive alkylphenolic | 3.500 |
| terpene phenolic resin | 2.000 |
| polyvinyl isobutyl ether (60% in benzene) | 2.000 |
| hexane | 50.000 |
| toluene | 50.000 |
| methyl alcohol | 2.000 |

The stitching of individual pieces to form a garment can be performed in the usual way well known to experts in this field. A stitch seam protected with the adhesive tape having the composition indicated above was subjected to tests conducted with Branca waterproof apparatus No. 35, and a well defined impermeability to water was noted. Moreover, the tape once applied is effectively permanent and any attempt to remove the tape causes separation of the cladding from the padding layer indicating that the bond between the tape and the cladding layer is stronger than the bond between the cladding layer and the underlying padding material itself; moreover, the resistance to washing has been found to be good.

With the seam waterproofing tape of the invention there is therefore the possiblity of obtaining an adequate protection of the stitching lines with the application of the tape in a rapid and easy manner. The provision and design of this tape is of considerable importance in that it allows an item of clothing which has excellent characteristics of comfort to be obtained; in fact, the tape itself blends perfectly with the structure of the item of clothing and follows its shape at all points.

What is claimed is:

1. A self-adhesive tape for application over the stitch lines of an item of clothing having padding with a high degree of thermal insulation, comprising:

a polyamide fibre fabric support layer having a first face and an opposite face, a polyurethane resin waterproof cladding layer on said first face of said support layer, and a self-adhesive elastomer based layer on said opposite face of said support layer, said elastomer-based adhesive layer having the following composition, in parts by weight:

| | |
|---|---|
| natural rubber (NR) | 20.000 |
| antioxidant (sterically inhibited polyphenol) | 0.100 |
| active zinc oxide | 2.000 |
| zinc resinate | 1.500 |
| stearic acid | 0.100 |
| hydrogenated polycyclodiene hydrocarbon resin | 9.000 |
| aliphatic hydrocarbon resin with cyclic structure | 2.000 |
| polyaliphatic hydrocarbon resin | 5.000 |
| reactive alkylphenolic | 3.500 |
| terpene phenolic resin | 2.000 |
| polyvinyl isobutyl ether (60% in benzene) | 2.000 |
| hexane | 50.000 |
| toluene | 50.000 |
| methyl alcohol | 2.000 |

* * * * *